United States Patent
Chang et al.

(10) Patent No.: US 8,103,821 B2
(45) Date of Patent: Jan. 24, 2012

(54) FLASH MEMORY DEVICE WITH WEAR-LEVELING MECHANISM AND CONTROLLING METHOD THEREOF

(75) Inventors: Li-Pin Chang, Taipei County (TW); Ming-Dar Chen, Hsinchu (TW); Chien-Ting Huang, Taipei County (TW)

(73) Assignee: A-Data Technology Co., Ltd., Taipei (TW)

( * ) Notice: Subject to any disclaimer, the term of this patent is extended or adjusted under 35 U.S.C. 154(b) by 468 days.

(21) Appl. No.: 12/396,547

(22) Filed: Mar. 3, 2009

(65) Prior Publication Data
US 2010/0115186 A1    May 6, 2010

(30) Foreign Application Priority Data
Oct. 31, 2008 (TW) .............................. 97141954 A

(51) Int. Cl.
*G06F 12/02* (2006.01)
(52) U.S. Cl. ............... 711/103; 711/170; 711/E12.008
(58) Field of Classification Search .................. None
See application file for complete search history.

(56) References Cited

U.S. PATENT DOCUMENTS

| | | | |
|---|---|---|---|
| 2006/0106972 A1* | 5/2006 | Gorobets et al. | 711/103 |
| 2009/0254729 A1* | 10/2009 | Lin et al. | 711/170 |
| 2010/0017555 A1* | 1/2010 | Chang et al. | 711/103 |
| 2010/0185805 A1* | 7/2010 | Chen et al. | 711/103 |

* cited by examiner

Primary Examiner — Kevin Verbrugge
(74) Attorney, Agent, or Firm — Kile Goekjian Reed & McManus PLLC

(57) ABSTRACT

A flash memory device with a wear-leveling mechanism includes at least one flash memory, a hot list, a bitmap, a source pointer, and a controller. The controller obtains a physical memory block with high erase count through the hot list, an erase count of the physical memory block, and an overall average erase count of the flash memory device. The controller further finds out a physical memory block which stores static data through managing the bitmap and the source pointer. The controller moves the static data to the physical memory block with high erase count, and releases the physical memory block which stores the static data to avoid the physical memory block with high erase count being worn down increasingly more seriously.

14 Claims, 10 Drawing Sheets

FLASH MEMORY DEVICE WITH WEAR-LEVELING MECHANISM AND CONTROLLING METHOD THEREOF

BACKGROUND OF THE INVENTION

1. Field of the Invention

The present invention relates to a flash memory device and a controlling method of the flash memory device, and more particularly to a flash memory device with a wear-leveling mechanism and its controlling method.

2. Description of Related Art

Since nonvolatile memory storage devices adopting NAND flash memories come with the advantages of small size, power-saving, and shock-resisting features, nonvolatile memory storage devices are used extensively in various different application systems such as network servers, notebook computers, desktop computers, portable music players and mobile communication devices, etc.

With reference to FIG. 1 for a system block diagram of a traditional flash memory device, the flash memory device 8 comprises a controller 81 and at least one flash memory 82, wherein the flash memory 82 is used for storing data, and the controller 81 is connected to an application system 9 for receiving an instruction issued by the application system 9 to perform an operation of accessing data according to the operation corresponding to the instruction to record the data inputted by the application system 9 into the flash memory 82 or processing the data read from flash memory 82 and requested by the application system 9. In such a structure, the flash memory 82 stores and writes data by a memory cell array comprised of a plurality of memory units, wherein the memory cell array is arranged into a plurality of physical memory blocks, and each memory block includes a plurality of memory pages. In an access operation, the flash memory 82 uses the memory page as a unit of reading and writing, and the memory block as a unit of erasing data.

At present, flash memory has relatively short use life when it is used for storing data. In other words, the erase count of flash memory is an issue remaining to be solved. As we all know, flash memory generally uses a memory block as a unit to execute an erase operation for a block before the data is written into the flash memory, wherein each memory block will increase the accumulated erase count due to the erase operation performed before writing data. If the erase count of the memory block reaches the limitation of the flash memory, the reliability of data retention will be gradually degraded, and the flash memory may not record data reliably and correctly. Furthermore, failures may occur, since some of the memory blocks of a memory unit of the flash memory device are degraded. In general, the maximum allowable erase count of a flash memory falls in a range from one thousand times to ten thousand times (depending on the structure of the flash memory), and the frequent access operations will affect the life of the flash memory substantially.

To reduce the difference of accumulated erase count of each memory block, we must use each memory block evenly by means of a wear-leveling technique to prevent excessive use of a particular memory block and thereby avoid an early cessation of service or an unreliable or incorrect data storage of the flash memory device before all memory blocks are fully used.

The present wear-leveling techniques are mainly divided into two types: a dynamic wear-leveling technique and a static wear-leveling technique. In the dynamic wear-leveling technique, an erased memory block with the smallest erase count is selected for storing updated data, when the data recorded and stored in a memory block is updated. Since only the address of dynamic data having an updated content will be adjusted, this technique is called the dynamic wear-leveling technique.

In the static wear-leveling technique, the static wear-leveling operation will be started immediately if the difference between the largest accumulated erase count and the smallest accumulated erase count of a memory block reaches a predetermined threshold, even though the data recorded and stored in a memory block has not been updated. When the static wear-leveling operation is executed, the controller moves the data stored in a memory block having the smallest accumulated erase count to an erased memory block having the largest accumulated erase count, and erases the memory block having the smallest accumulated erase count. Therefore, the memory block address of the static data can be changed, and the memory block previously occupied by static data for a long time can be released, and the memory block having a lower accumulated erase count can be provided for the use of writing other updated data, so as to adjust the memory block address of the static data and achieve the static wear-leveling effect.

However, the static wear leveling operation consumes much time and resources to search for the memory block having a lower accumulated erase count, and the dynamic wear-leveling operation is performed for a memory block having updated data only, and thus the drawback of having uneven erases still exists, and there is a long-desired need for improving the performance of the wear leveling operation.

SUMMARY OF THE INVENTION

In view of the shortcomings of the prior art, the inventor of the present invention provides an efficient management method to trace memory blocks of high erase count and containing static data to execute a wear leveling operation for a flash memory, so as to improve the performance of the wear leveling operation and the life of the flash memory used as a storage medium.

To achieve the foregoing objective, the present invention provides a flash memory device with a wear-leveling mechanism, comprising: at least one flash memory, a hot list, a bitmap, a source pointer and a controller, wherein the flash memory includes a memory unit, and the memory unit includes a plurality of physical memory blocks. The hot list is provided for recording a plurality of recently written-in logical block addresses, and the bitmap includes a plurality of bits mapped with the corresponding physical memory blocks respectively and indicate the status of the physical memory blocks. The source pointer sequentially points at a physical memory block marked as not-yet-erased in the bitmap, and moves through updates. The controller obtains at least one physical memory block with high erase count according to the hot list, and moves the data in the physical memory block pointed to by the source pointer to the physical memory block with high erase count to complete the wear leveling operation.

To achieve the foregoing objective, the present invention further provides a controlling method of a flash memory device with a wear-leveling mechanism, and the method comprises the steps of: selecting at least one desired recycle physical memory block to execute a memory block recycle operation; moving valid data in the desired recycle physical memory block into an erased physical memory block; and setting the desired recycle physical memory block as a target block and updating a source pointer to set a physical memory block specified by the source pointer as a source block if the logical block address corresponding to the desired recycle physical memory block exists in a hot list and the desired recycle physical memory block is a physical memory block with high erase count; and erasing the source block to produce a new erased physical memory block after the data in the source block is duplicated to the target block.

Through the management of the hot list, bitmap and source pointer, a physical memory block which has not been erased for a long time can be traced correctly, and the data of the traced physical memory block are moved to the physical memory block with high erase count to release the occupied physical memory block for storing data and prevent wearing out the physical block with high erase count continuously. In addition, the design of the present invention can enhance the performance of the flash memory device to execute the wear leveling operation, and maximize the life expectancy of the flash memory device.

The above and other objects, features and advantages of the present invention will become apparent from the following detailed description taken with the accompanying drawing.

DETAILED DESCRIPTION OF PREFERRED EMBODIMENTS

In the present invention, an efficient management method is used to trace a physical memory block with a higher erase count and a physical memory block having static data to execute a wear leveling operation of the flash memory in order to enhance the performance of the wear leveling operation, and improve the life of a flash memory device.

Figure 1:
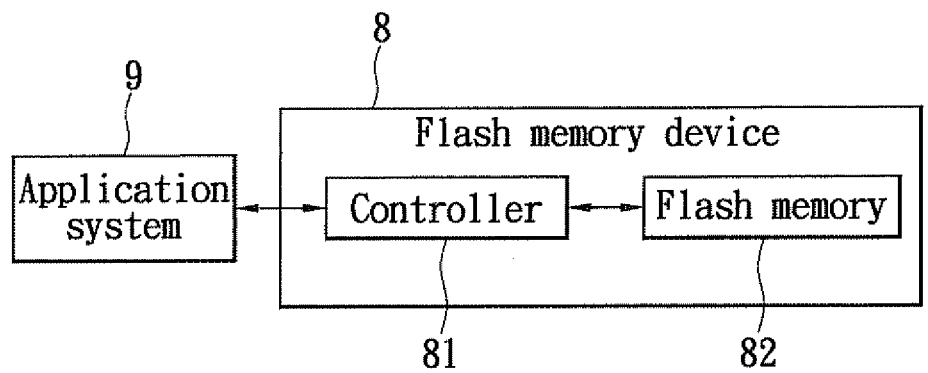
FIG. 1 is a system block diagram of a traditional flash memory device.
Figure 2:
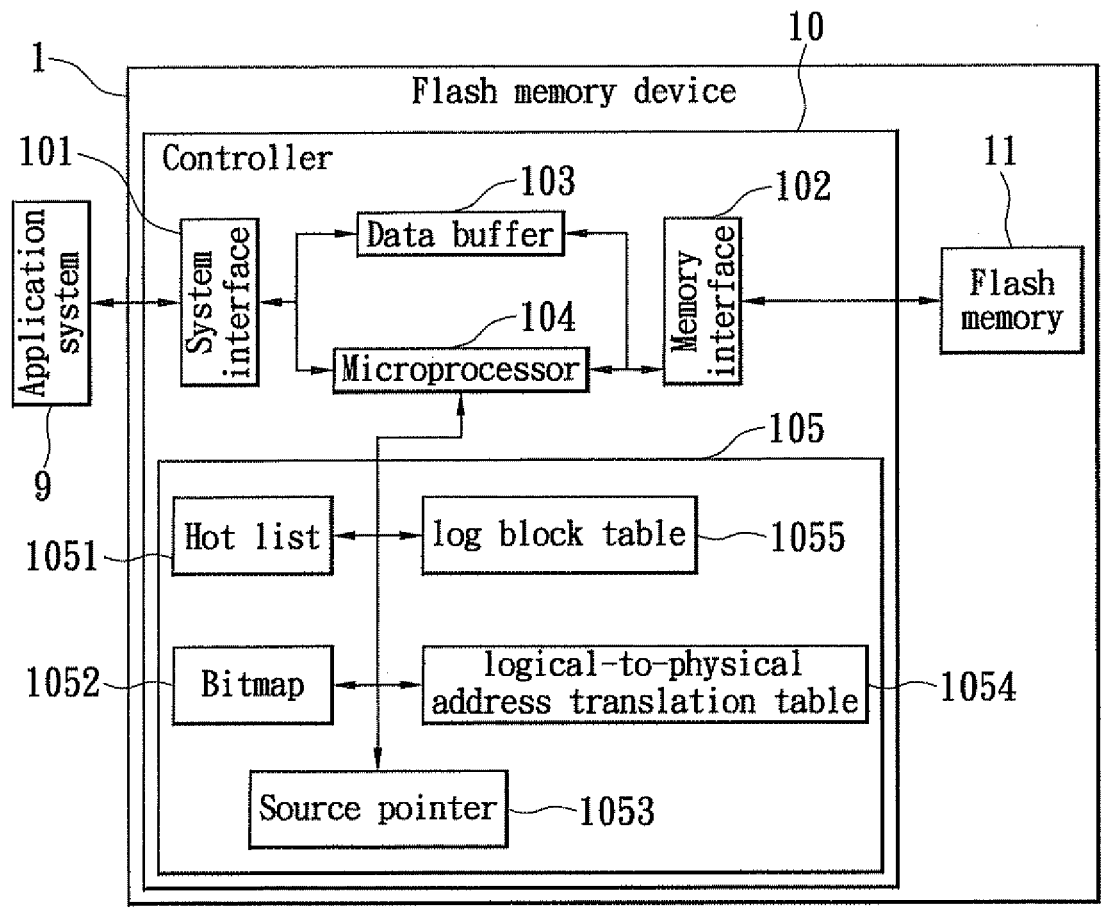
FIG. 2 is a block diagram of a flash memory device with a wear-leveling mechanism in accordance with the present invention.

With reference to FIG. 2 for a block diagram of a flash memory device with a wear-leveling mechanism in accordance with the present invention, the flash memory device 1 comprises a controller 10 and at least one flash memory 11. The controller 10 further comprises a system interface 101, a memory interface 102, a data buffer 103, a microprocessor 104 and a storage unit 105. The flash memory 11 comprises a memory unit (not shown in the figure) which is also know as a memory cell array, and the memory unit is arranged into a plurality of physical memory blocks (not shown in the figure).

In the illustration of the present invention by this embodiment, the storage unit 105 of is embedded into controller 10, and but not limited to such arrangement only, and the storage unit 105 can be designed to be connected externally to the controller 10. The storage unit 105 can adopt the design of a random access memory (RAM).

The system interface 101 of the controller 10 is coupled to an application system 9 to serve as a transmission interface for transmitting instructions and data between the application system 9 and the flash memory device 1. The memory interface 102 is coupled to the flash memory 11. Similarly, the data buffer 103 adopts the design of RAM and is coupled between the system interface 101 and the memory interface 102 for buffering the data transmitted between the application system 9 and the flash memory 11. The microprocessor 104 is coupled to the system interface 101, the memory interface 102, and the storage unit 105, and used to execute the instruction transmitted from the application system 9 to the flash memory device I and control the data access of the flash memory 11.

Figure 3:
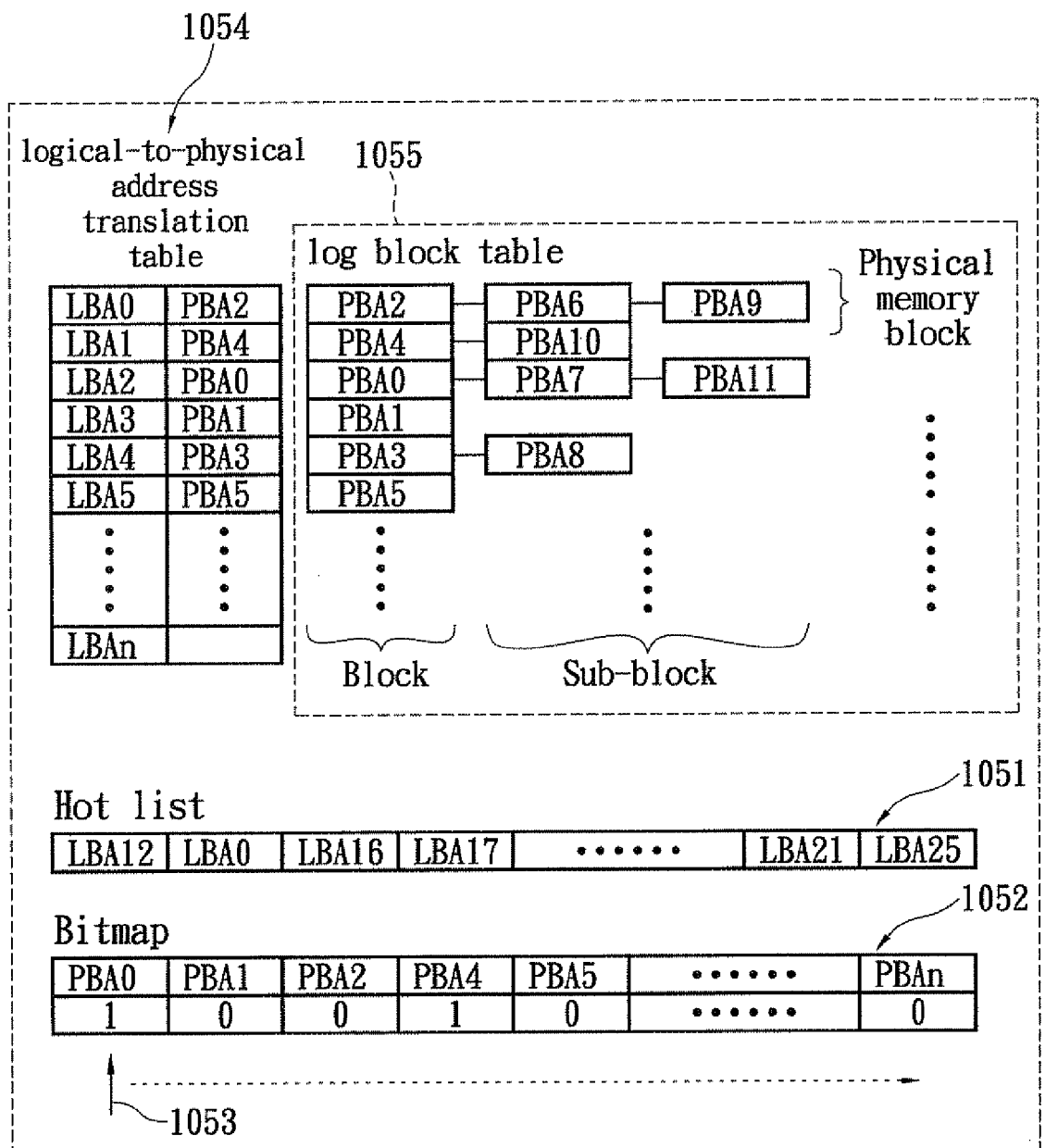
FIG. 3 is a schematic view of a list and a pointer in accordance with a preferred embodiment of the present invention.

The storage unit 105 comprises a hot list 1051, a bitmap 1052, a source pointer 1053, a logical-to-physical address translation table (L2P) 1054 and a log block table 1055. With reference to FIG. 3 for a schematic view of a list and a pointer in accordance with a preferred embodiment of the present invention, the hot list 1051 records a plurality of recently written logical block addresses, wherein each written record of data records the logical block address of each record of data in the hot list 1051, and the hot list 1051 includes the list of logical block addresses of the recent most frequently updated data. If the microprocessor 104 of the controller 10 receives an instruction for updating data, then the hot list 1051 will be updated accordingly and immediately. Since the physical memory block with high erase count is one of the frequently updated memory block, therefore the physical memory block with high erase count will be mapped to the corresponding logical block address accessed frequently, and the physical memory blocks corresponding to the logical block addresses listed in the hot list 1051 may be the physical memory blocks with high erase count. By checking the hot list 105 1, we can trace the physical memory block with high erase count.

The bitmap 1052 includes a plurality of bits (not shown in the figure) for mapping the physical memory blocks and indicating an erase status of the physical memory blocks. In other words, the bitmap 1052 provides a corresponding bit for each physical memory block of the flash memory 11, and the bit value is used for indicating whether or not the physical memory block has been erased. In the design, a bit value of "1" can be represented for indicating an erased physical memory block, and a bit value of "0" can be used for indicating a not-yet-erased physical memory block, but the invention is not limited to such arrangement only, the design can be designed in the other way around according to different practical applications.

The source pointer 1053 operates together with the bitmap 1052 to sequentially point at not-yet-erased physical memory blocks marked in bitmap 1052, such as the physical memory block with the bit value set to "0" mapped in the bitmap 1052. The source pointer 1053 is moved by the instruction of updating the source pointer 1053, so that after the source pointer 1053 moves from the first physical memory block of the bitmap 1052 sequentially downward and points at the final not-yet-erased physical memory block, the source pointer 1053 will start pointing at the not-yet-erased physical memory block from the starting position of the bitmap 1052 sequentially downward again. Therefore, the physical memory blocks that have not been erased for a long time can be traced, and the pointed physical memory block is considered as the physical memory block that stores the static data.

It is noteworthy to point out that the source pointer 1053 points at the bitmap 1052 sequentially and cyclically, and after the source pointer 1053 passes through an erased physical memory block marked in the bitmap 1052, the bitmap 1052 changes and sets the erased physical memory block as a not-yet-erased physical memory block. When the source pointer 1053 returns to the starting point after a loop, it shows a record whether or not there is any physical memory block being erased during the process of going through the loop by the source pointer 1053. In other words, the management method of using the bitmap 1052 and the source pointer 1053 shows whether or not the physical memory block at an address has a record of being erased after the source pointer 1053 leaves that particular address.

For those ordinarily skilled in the art, the logical-to-physical address translation table 1054 and the log block table 1055 in the storage unit 105 are tables provided for the controller 10 to communicate with the application system 9. The logical-to-physical address translation table 1054 is provided for the controller 10 to map the logical block address with the physical block address. In FIG. 3, the logical block address LBA0 maps with the physical memory block PBA2, and the logical block address LBA1 maps with the physical memory block PBA4, and so on.

The log block table 1055 is collocated with the logical-to-physical address translation table 1054 and used for recording a link relation between the physical memory blocks in the flash memory 11. In other words, a logical block address may map to one or more physical memory blocks (hereinafter referred to as a "physical memory block chain") for storing valid data. Therefore, the log block table 1055 is used for recording the link relation between a block and sub-block and a block chain in the physical memory.

The microprocessor 104 of the controller 10 confirms and obtains at least one physical memory block with high erase count according to the hot list 1051 and controls moving data in the physical memory block with high erase count pointed to by the source pointer 1053 to complete the execution of the wear leveling operation. In FIG. 3, a physical memory block PBA2 is used for illustration. If the controller 10 receives the updated data from a logical block address which is LBA0 transmitted from the application system 9, then the controller 10 will select an erased physical memory block PBA6 to record and update the data, so that both PBA2 and PBA6 store valid data. The log block table 1055 is used for recording the link relation between the PBA2 and the PBA6. If the application system 9 writes updated data into LBA0 again and even the erased physical block PBA9 is used for recording the updated data, the log block table 1055 is also updated to record the link relation among PBA2, PBA6 and PBA9 for tracing valid data in the physical memory block.

It is noteworthy to point out that the microprocessor 104 of the controller 10 further temporarily stores an accumulated erase count of each of the physical memory blocks and an overall average erase count of the flash memory device 1 in the process of confirming and obtaining the physical memory block with high erase count, and confirms and obtains the physical memory block with high erase count according to the erase count and the overall average erase count of the physical memory blocks. In other words, if the microprocessor 104 determines that the erase count of any physical memory block greater than the overall average erase count reaches a predetermined value, the physical memory block is confirmed as a physical memory block with high erase count.

Figure 4:
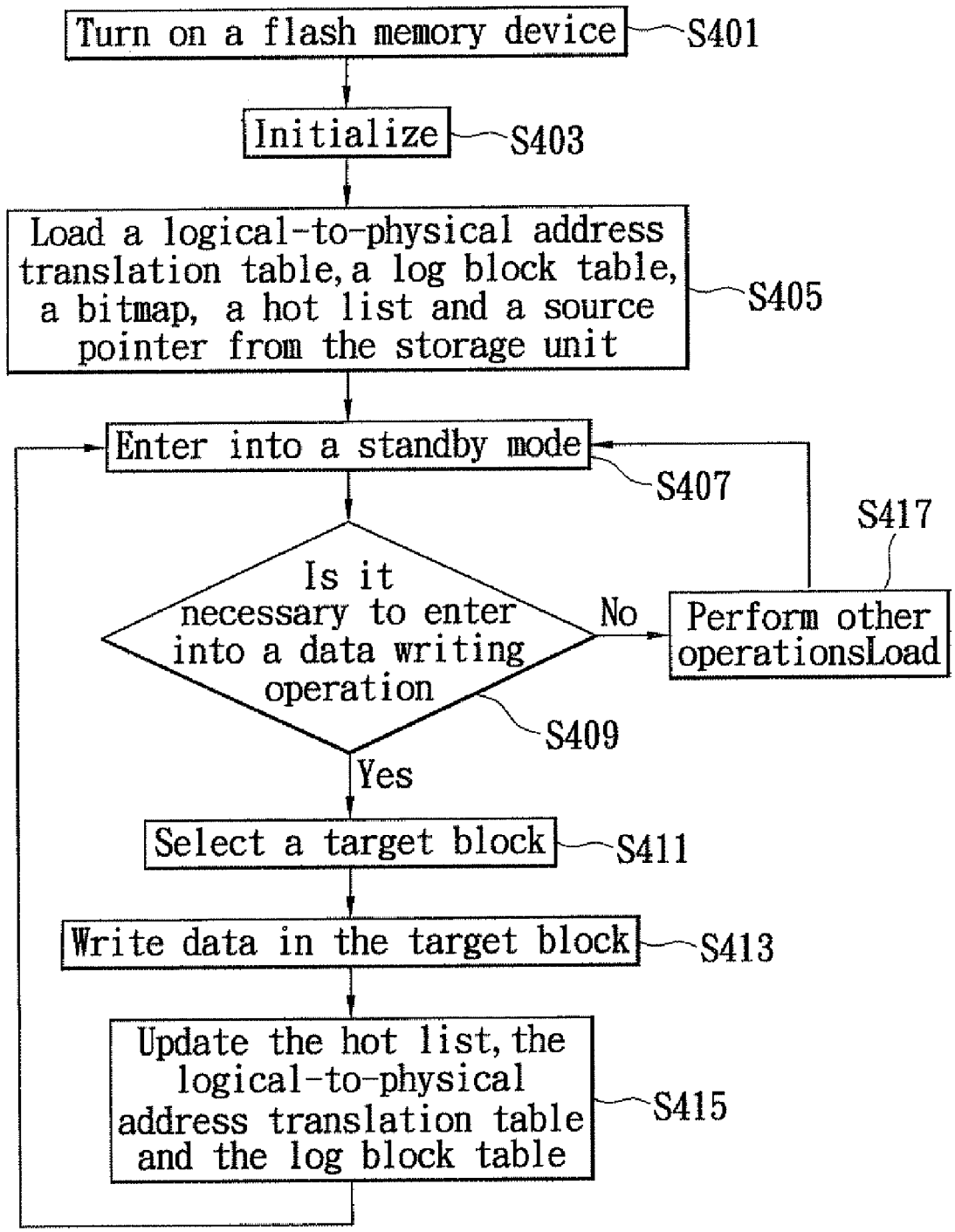
FIG. 4 is a flow chart of turning on and controlling a write-in operation of a flash memory device in accordance with a preferred embodiment of the present invention.

With reference to FIG. 4 for a flow chart of turning on and controlling a write-in operation of a flash memory device in accordance with a preferred embodiment of the present invention, the flash memory device is turned on (S401), and the flash memory device will perform an initialization process (S403), such that the flash memory device can establish a connection with the application system for communicating and transmitting an instruction and data.

Based on the design of a flash memory device in accordance with a preferred embodiment of the present invention, the controller of the flash memory device will load a logical-to-physical address translation table, a log block table, a bitmap, a hot list, and a source pointer from the flash memory into the storage unit of the controller (S405) after the Step (S403) take place. The flash memory device will enter into a standby mode (S407) to wait for another instruction issued by the application system.

When the application system issues an instruction, the controller determines whether or not to enter into a data writing operation according to the instruction (S409). If the determination result of the Step (S409) is affirmative, then it means the application system issues a write instruction for selecting an erased memory block as a target block for writing data (S411), and receives data transmitted from the application system to write the data into the target block (S413). After the data is written, the hot list is updated, and the logical block address indicated by the write instruction is listed in the hot list, and the logical-to-physical address translation table is updated to maintain the correspondence of the logical block address and the physical block address, and the log block table can be updated if necessary to update and record the link relation between the block and the sub-block (S415).

On the other hand, if the determination result of the Step (S409) is negative, it means that the application system is not issuing a write instruction, and thus the controller executes other operation corresponding to the instruction issued by the application system (S417).

Figure 5A:
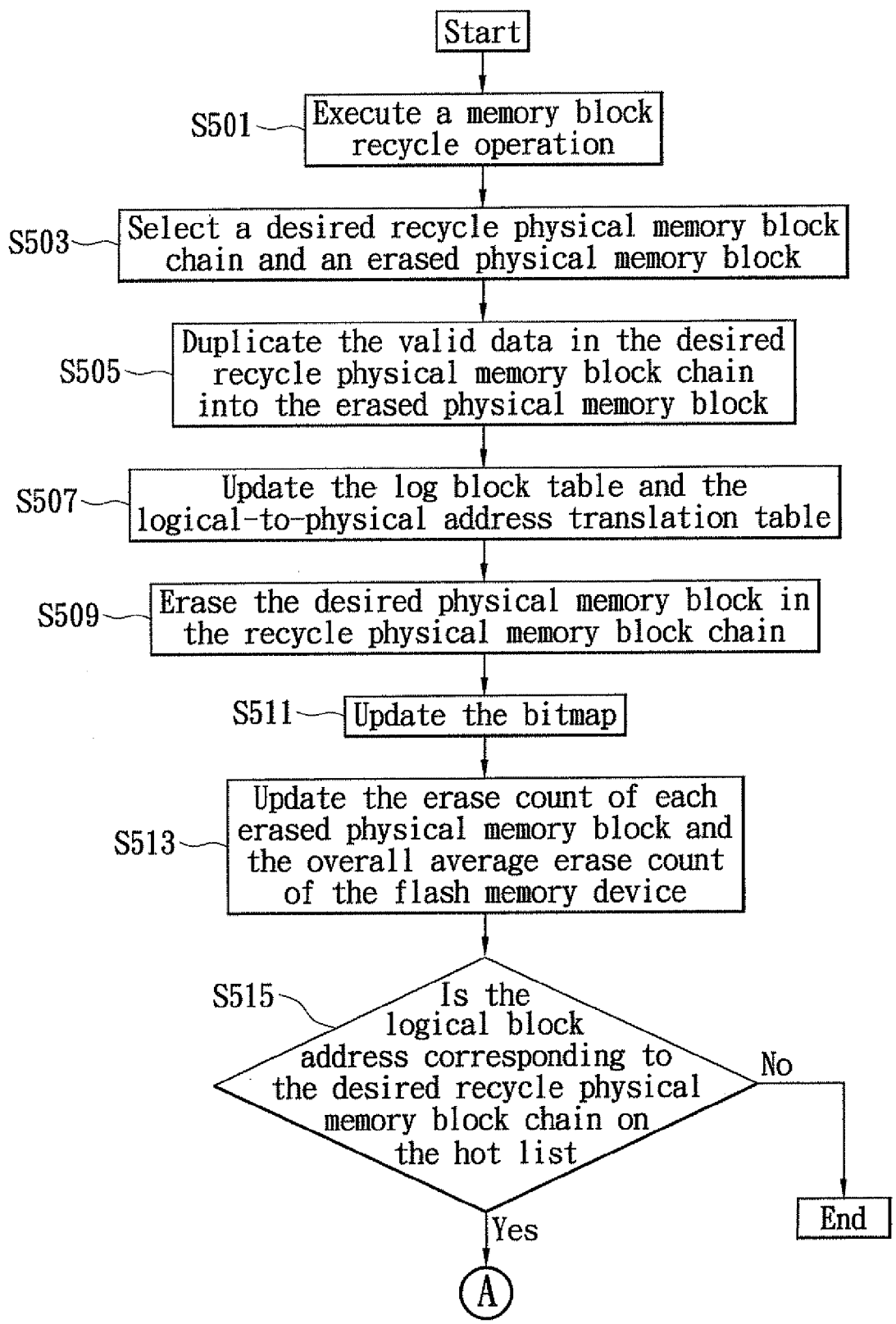
FIGS. 5A and 5B are flow charts of controlling a flash memory device to perform a wear-leveling operation in accordance with a preferred embodiment of the present invention.
Figure 5B:
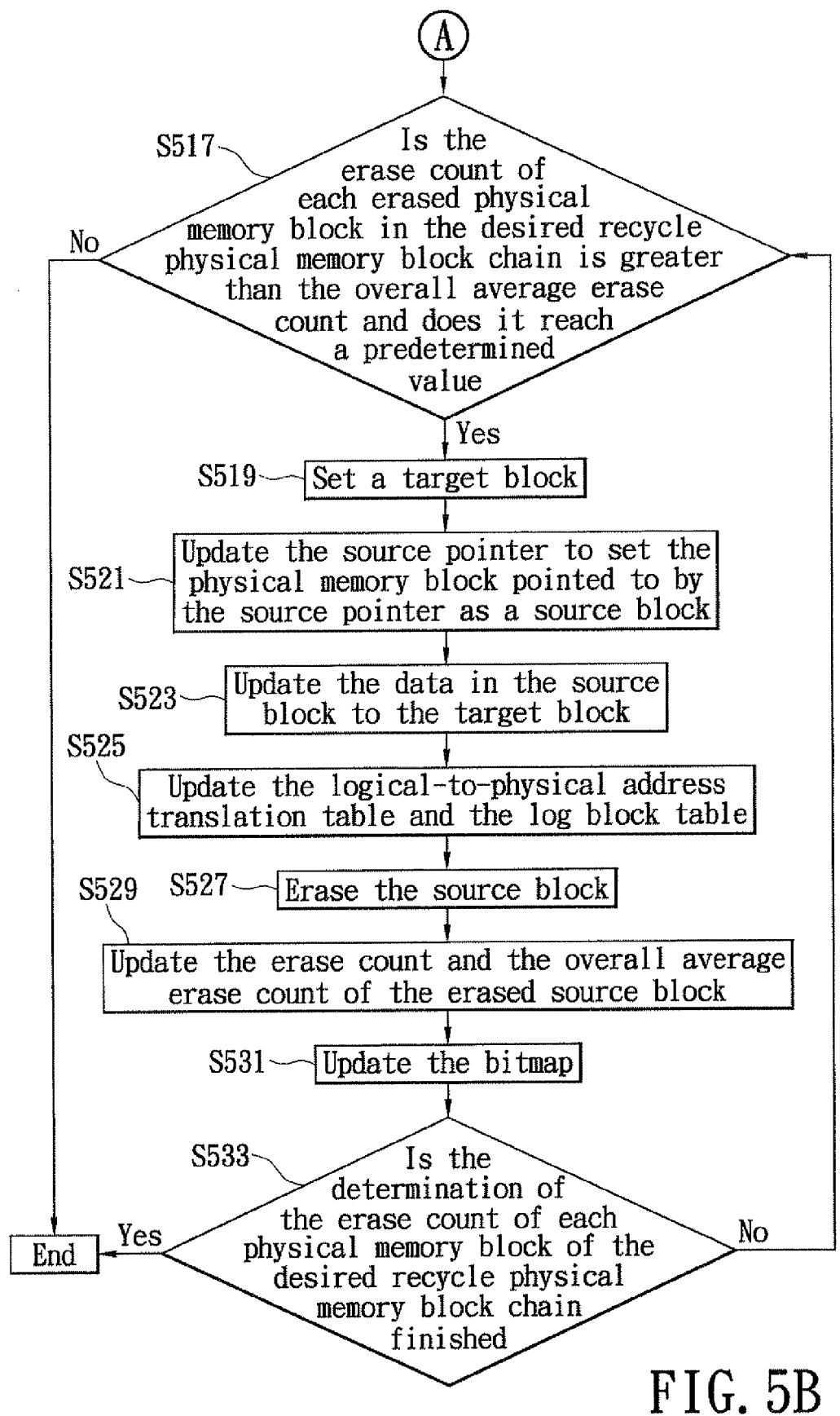

With reference to FIG. 4 for a flow chart of executing a data writing operation of a flash memory device in accordance with a preferred embodiment of the present invention, the time of performing the wear leveling operation is held at the same time of performing a memory block recycle operation. In other words, when the controller executes an erase mechanism to perform the memory block recycle operation, the flow of the wear leveling operation will be executed. In FIGS. 5A and 5B, the flow chart of controlling the wear leveling operation of the flash memory device of the present invention is used for illustrating the actual wear leveling operation of the present invention.

In FIG. 5A, when the controller of the flash memory device starts executing a memory block recycle operation (S501), a desired recycle physical memory block chain and an erased physical memory block will be selected (S503), such that the valid data in the desired recycle physical memory block chain is duplicated into the erased physical memory block (S505). The log block table is updated to cancel the link relation between the physical memory blocks in the desired recycle physical memory block chain and update the logical-to-physical address translation table for mapping the valid data stored in the physical memory block with the logical block address (S507).

Since the valid data in the desired recycle physical memory block chain has been stored in the erased physical memory block, and then erased the desired physical memory block in the recycle physical memory block chain (S509) to release the space originally occupied by the data. In Step (S509), the bitmap is updated after the physical memory blocks is erased (S511), and the physical memory block is marked as an erased physical memory block. After the bitmap is updated, the erase count of each erased physical memory block and the overall average erase count of the flash memory device are accumulated (S513).

Since the logical block address corresponding to the desired recycle physical memory block chain is stored temporarily when the controller selects the desired recycle physical memory block chain, a process of determining whether or not the logical block address corresponding to the desired recycle physical memory block chain is on the hot list (S515) after the Step (S513) takes place. If the determination result of Step (S515) is negative, it means that the logical block address is not found in the hot list, and thus the procedure is ended without the need of executing the wearing leveling operation. On the other hand, if the determination result of the Step (S515) is affirmative, then the erase count of each erased physical memory block in the desired recycle physical memory block chain greater than the overall average erase count is determined whether or not it reaches a predetermined value (S517). In other words, the erase count of each erased physical memory block in the desired recycle physical memory block chain is determined whether or not it exceeds a predetermined erase count, and the predetermined erase count is the sum of the overall average erase count of the physical memory blocks and the predetermined value, for determining whether or not the erased physical memory block has reached the standard of triggering the execution of the wear leveling operation and the erased physical memory block is considered as a physical memory block with high erase count, wherein the setting of the predetermined value can be adjusted according to the actual erase resisting capability of the flash memory.

If the determination result of the Step (S517) is negative, it means that the requirement of starting the wear leveling operation has not met, and it is not necessary to execute the wear leveling operation. Therefore, the erased physical memory block is provided for cyclical use again. If the determination result of the Step (S517) is affirmative, then it means that the standard of triggering the wear leveling operation has met, and the block determined as an erased physical memory block in the desired recycle physical memory block chain is set to a target block (S519). The source pointer is updated to set the physical memory block pointed to by the source pointer as a source block (S521). The physical memory block pointed to by the source pointer is a physical memory block that has not been erased for a long time, and also is a physical memory block that stores static data.

Therefore, the data in the source block is duplicated to the target block (S523) for duplicating the static data (which is the data with less update) to into a physical memory block with high erase count. After the data is duplicated, the logical-to-physical address translation table and the log block table are updated (S525) for mapping the target block to the corresponding logical block address. The source block is erased (S527) for releasing the physical memory block (which is the physical memory block with less erase count) that originally stores the static data to become a new erased physical memory block provided for storing other data. The erase count and the overall average erase count of the erased source block are updated immediately (S529), and the erase status in the bitmap is updated (S531) to mark the erased source block as an erased physical memory block.

Finally, the procedure determines whether or not the erase count of each physical memory block of the desired recycle physical memory block chain is finished (S533). If the determination result of the Step (S533) is negative, the steps following the Step (S517) will be repeated until all physical memory blocks in the desired recycle physical memory block chain are completed, so as to end the wear leveling operation.

As long as the controller of the flash memory device is executing the memory block recycle operation, the physical memory block with high erase count is found, and the less frequently updated static data is duplicated into a physical memory block with high erase count to avoid continuous erases, so as to improve the speed of the erase count and achieve the wear leveling effect of the flash memory.

With reference to FIGS. 6A to 6E for the further description of the change of illustrate each list and pointer operated in a flash memory device as shown in FIGS. 5A and 5B. FIGS. 6A to 6E show the operation status of the list and the pointer of the present invention, wherein the oblique line in the figures is used for indicating an executing block, but not indicating whether or not there is data in the block.

Figure 6A:
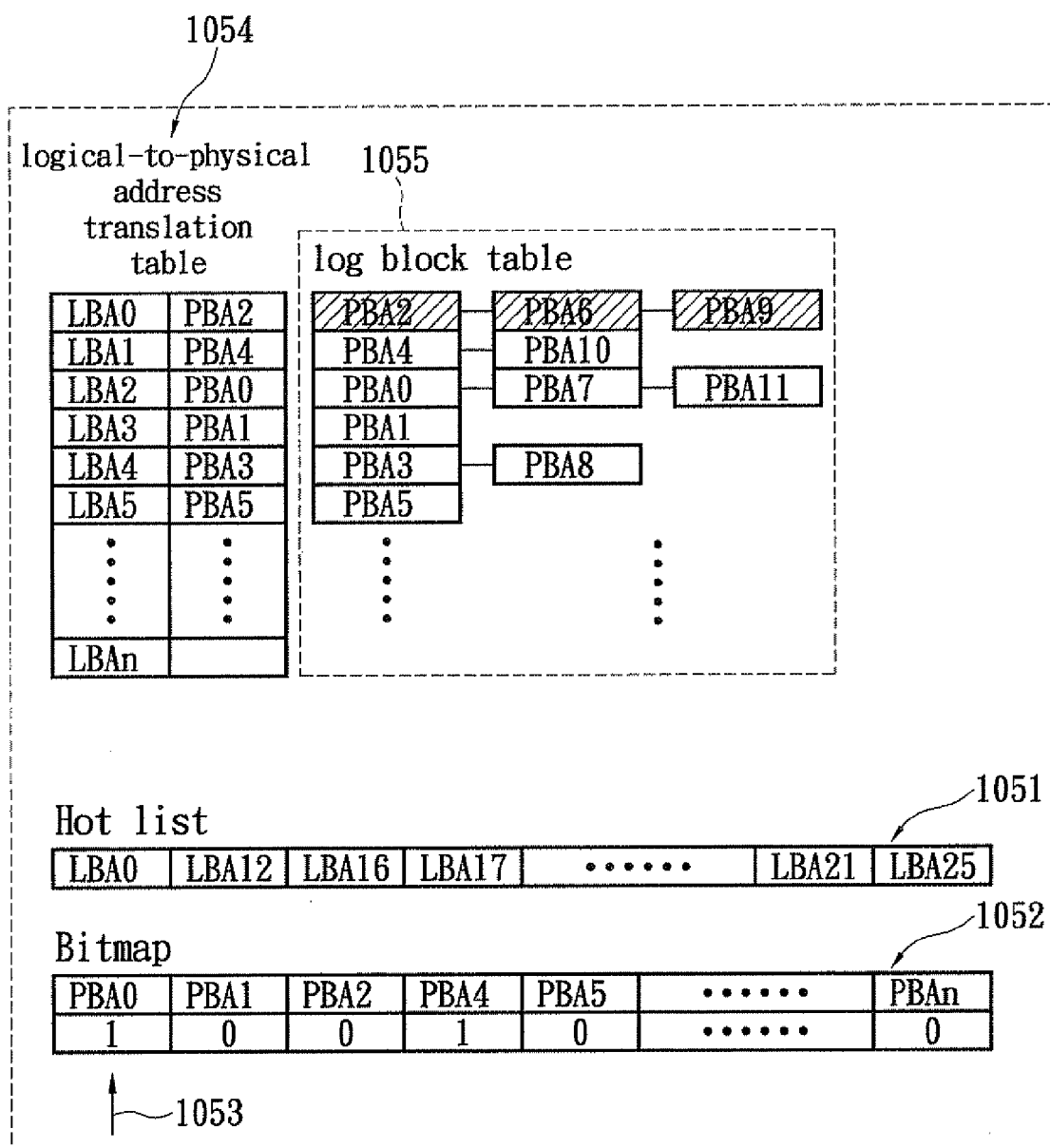
FIGS. 6A to 6E are schematic views of operating statuses of lists and pointers in accordance with a preferred embodiment of the present invention.

In FIG. 6A, the controller loads a hot list 1051, a bitmap 1052, a source pointer 1053, a logical-to-physical address translation table 1054 and a log block table 1055, and the physical memory block PBA2 in this embodiment is selected as the starting memory block for performing the recycle operation in the physical memory block chain.

Figure 6B:
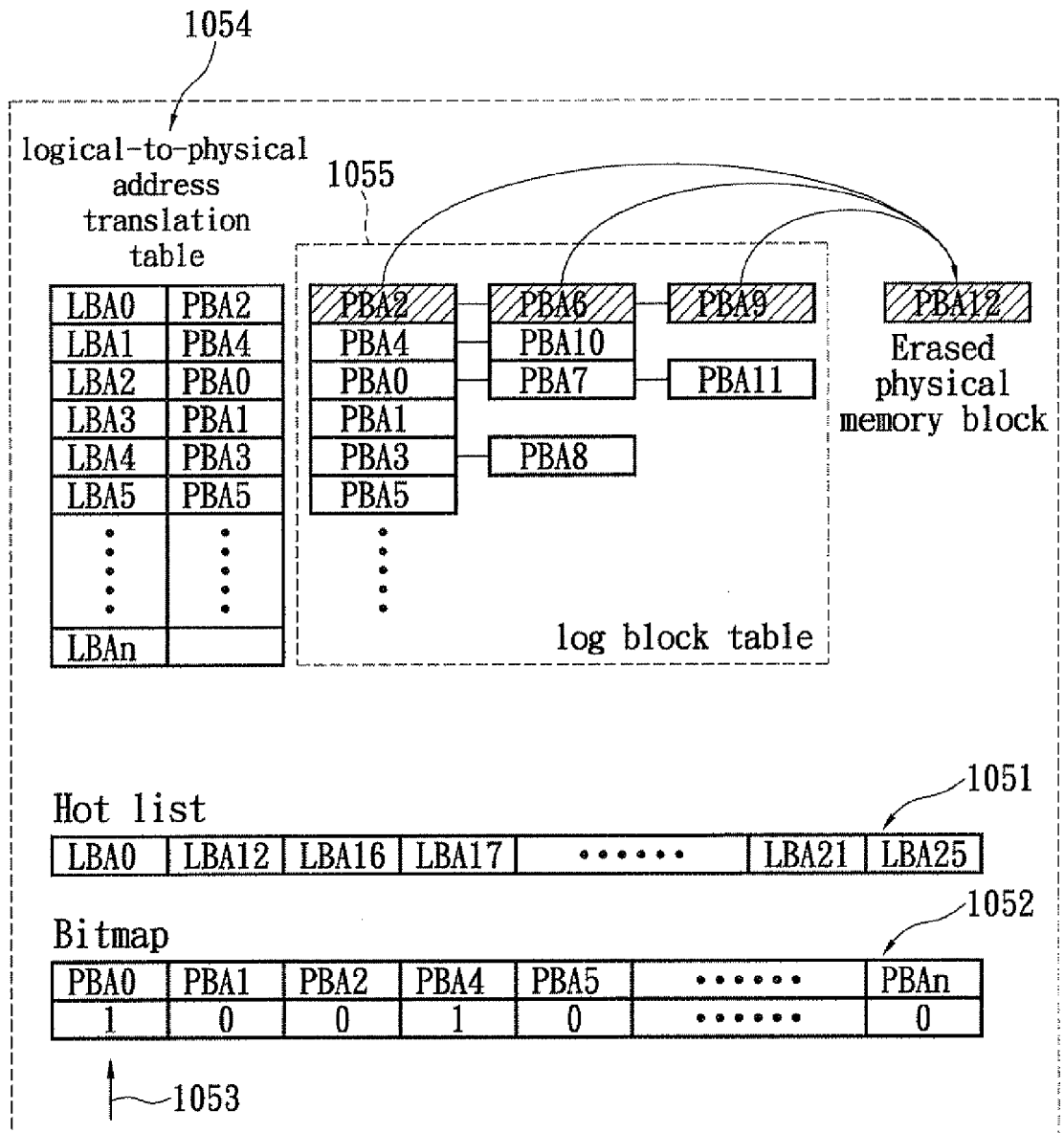

In FIG. 6B, the controller selects another erased physical memory block PBA12 as the target block and then duplicates the valid data in each physical memory block PBA2, PBA6 and PBA9 of the physical memory block chain into the target block PBA12.

Figure 6C:
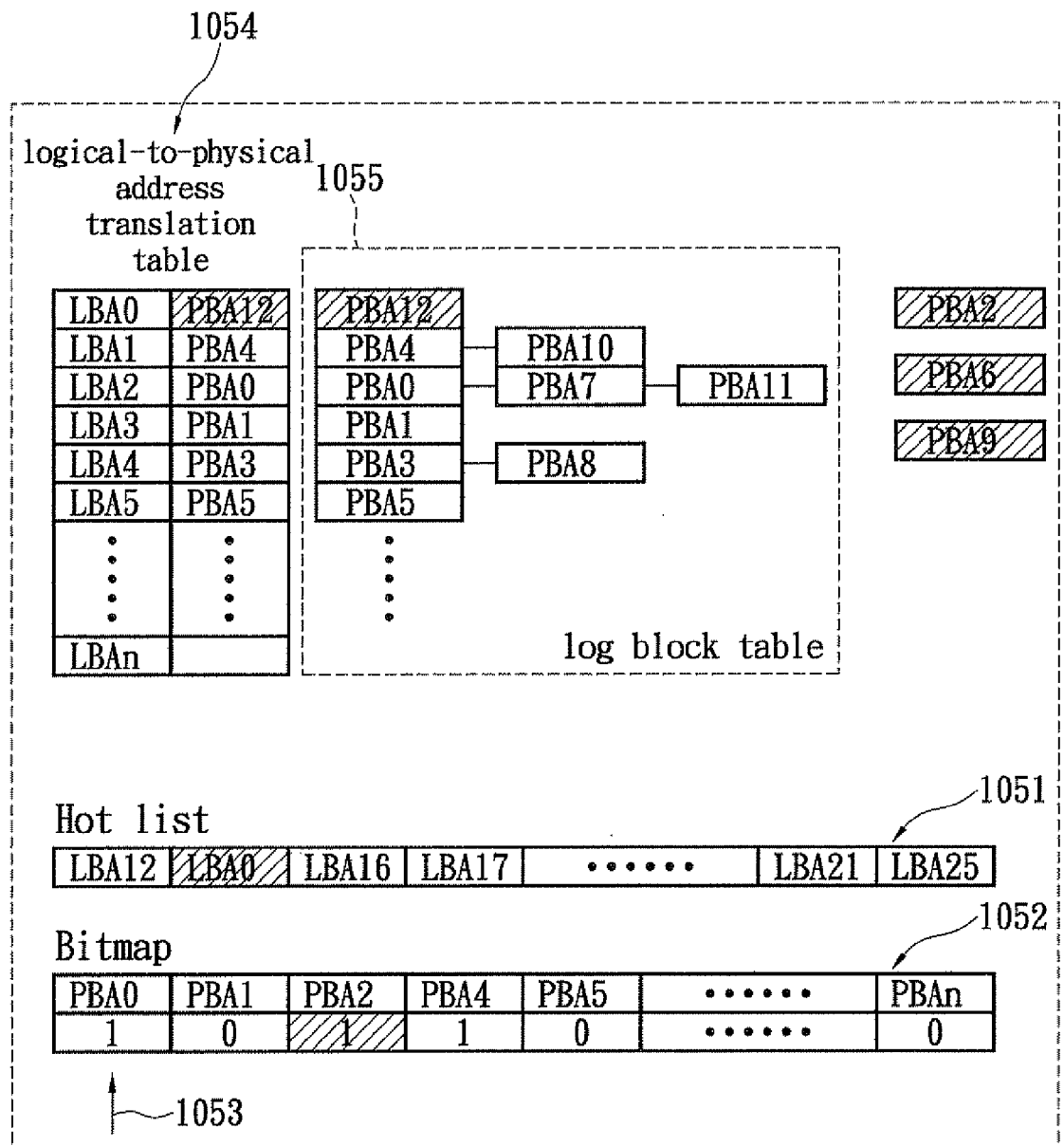

After the data is duplicated as shown in FIG. 6C, the controller updates the logical-to-physical address translation table 1054 and the log block table 1055, and updates the originally mapped logical block address LBA0 of the physical memory block PBA2 as the corresponding physical memory block PBA12, and then erases the physical memory blocks PBA2, PBA6 and PBA9, and finally updates the bitmap 1052 to set the corresponding bit of the physical memory blocks PBA2, PBA6 and PBA9 to a bit value of "1" (wherein only the physical memory block PBA2 is used for illustration in the figure), and the bit value "1" is used for indicating an erased physical memory block in this embodiment. Since the erase count of the physical memory blocks PBA2, PBA6 and PBA9 is changed, therefore the controller will update the erase count of the physical memory blocks PBA2, PBA6 and PBA9 and the overall average erase count of the flash memory device.

In FIG. 6C, the controller similarly checks the hot list 1051 to determine whether or not the selected logical block address LBA0 is on the hot list 1051, and the logical block address LBA0 exists in the hot list 1051, indicating that the data in the logical block address LBA0 has been updated recently.

Figure 6D:
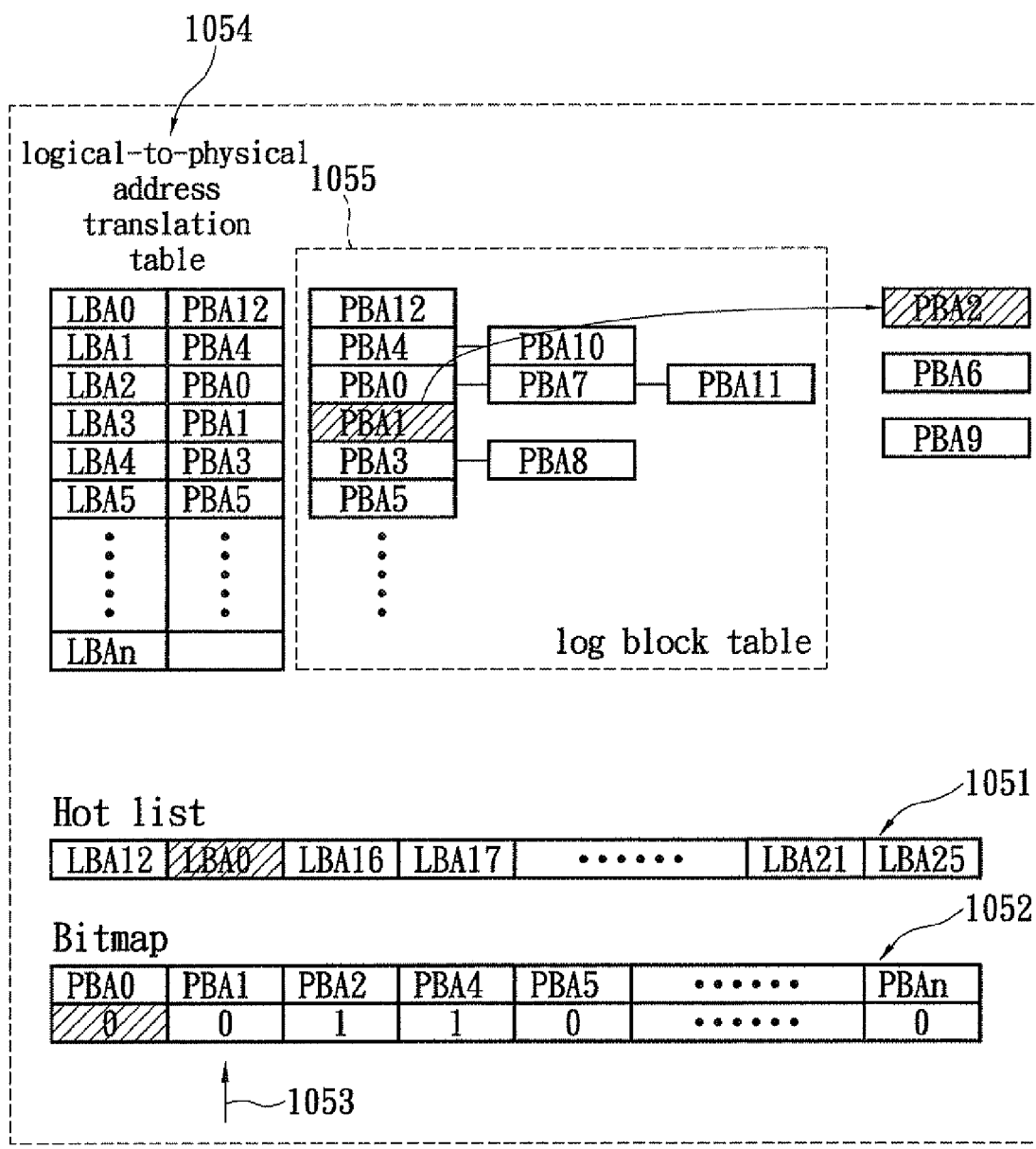

The erase count of each physical memory block PBA2, PBA6, and PBA9 in the physical memory block chain greater than the overall average erase count is determined whether or not it reaches a predetermined value. Assumed that the accumulated erase count of the physical memory block PBA2 is greater than the overall average erase count and reaches the predetermined value and the physical memory block PBA2 is a physical memory block with high erase count, the physical memory block PBA2 is set as a target block as shown in FIG. 6D, and the source pointer 1053 is updated, so that the source pointer 1053 is moved to the next not-erased physical memory block (having a bit value of "0"). In other words, the physical memory block PBA1 is set as a source block. It is noteworthy to point out that when the source pointer 1053 has passed through the erased physical memory block LBA0 as shown in FIG. 6D, the bit in bitmap 1052 is reset to a bit value "0" of a not-erased physical memory block.

Figure 6E:
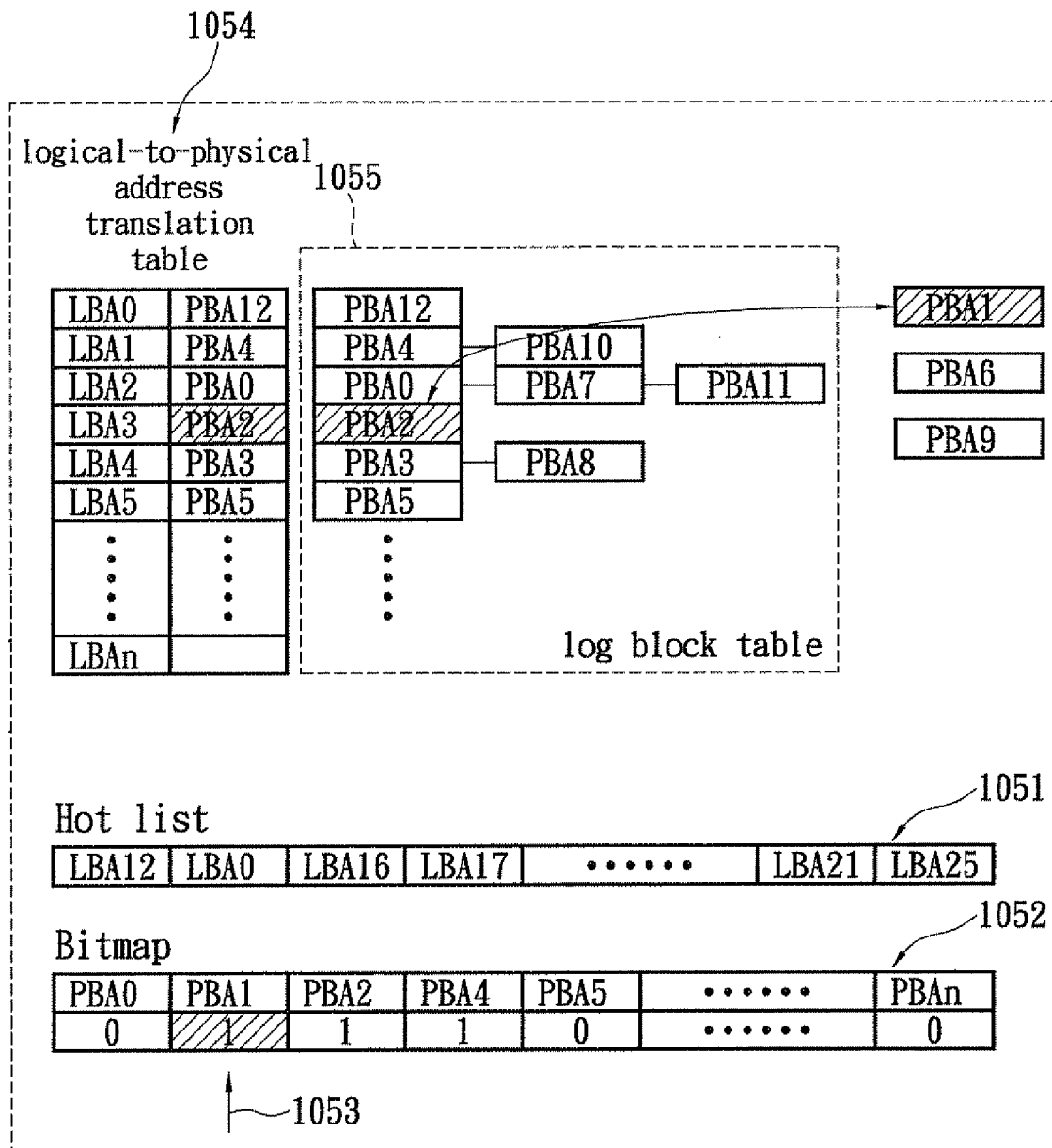

Therefore, the controller can duplicate the data in the foregoing source block PBA1 into the target block PBA2. In FIG. 6E, the logical-to-physical address translation table 1054 and the log block table 1055 are updated, so that the physical memory block PBA2 replaces the physical memory block PBA1 and maps with the logical block address LBA3. The physical memory block PBA1 can be erased to release the physical memory block for storing other data. The accumulated erase count and the overall average erase count of the physical memory block PBA1 are updated immediately and then the bitmap 1052 is updated to set the corresponding bit of the physical memory block PBA1 to a bit value "1", indicating an erased physical memory block. Therefore, the determination of the physical memory block PBA2 is completed.

Similarly, the same operation principle is used for determining the erase count of the rest of physical memory blocks PBA6 and PBA9 in the physical memory block chain to carry out the related operation, so as to complete the recycle operation of the whole physical memory block chain.

Finally, it is noteworthy to point out the situations that may be encountered during the process of executing the bitmap and the source pointer. Since the source pointer and the bitmap of the invention are designed according to the physical block address, therefore the pointed physical memory block (marked as not-yet-erased physical memory block with a bit value "0" in the bitmap) may be in one of the following cases:

(A) System block (storing firmware, block log table or any other data used by the controller);
(B) Free block (containing no valid data in the block);
(C) Allocated block or sub-block (containing a portion of valid data in the block); and
(D) Allocated and merged data block (containing a complete set of valid data in the block).

The source pointer of the invention is preferably pointed at the physical memory block as described in (D) for directly executing a data move operation of the whole physical memory block. If the source pointer points at a physical memory block as described in (A) or (B), then the source pointer will pass and skip the physical memory block and look for another not-yet-erased physical memory block downward. Even for the physical memory block on the bitmap as described in (A) or (B), the source pointer simply points at a physical memory block to reset it as an erased physical memory block. If the source pointer points at a physical memory block as described in (C), then the following arrangements may be adopted:

1. The source pointer skips the physical memory block look for another not-yet-erased physical memory block downward.
2. The source pointer points at a physical memory block (either a block or a sub-block) to execute the data move operation.
3. The source pointer points at a physical block and its related physical memory block to execute the data move operation, even for moving valid data of all physical memory blocks of a physical memory block chain.

Of course, the description above provides possible situations cases in practical application, but the design may vary according to the actual requirement of the application.

The wear leveling method of the invention can correctly identify static data through the management of the hot list, bitmap and source pointer, and move the static data into a physical memory block with high erase count to release the physical memory block occupied by the static data, and prevent continuously wearing the physical memory block with high erase count. With the aforementioned management of the pointer and the list, the present invention improves the drawback of consuming tremendous system resources for executing the wear leveling operation, assures the execution of the wear leveling operation and maximizes the life expectancy of the flash memory device.

Although the present invention has been described with reference to the preferred embodiments thereof, it will be understood that the invention is not limited to the details thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A flash memory device with a wear-leveling mechanism, comprising:
    at least one flash memory, including a memory unit, and the memory unit including a plurality of physical memory blocks;
    a hot list, for recording a plurality of recently written logical addresses;
    a bitmap, including a plurality of bits, each indicating an erase status of the corresponding physical memory block;
    a source pointer, for sequentially pointing at not-yet-erased physical memory blocks in the bitmap; and
    a controller, for obtaining at least one physical memory block with high erase count according to the hot list and an erase count of the physical memory block, duplicating the data in physical memory block pointed to by the source pointer into the physical memory block with high erase count, and erasing the physical memory block pointed to by the source pointer.

2. The flash memory device with a wear-leveling mechanism as in claim 1, wherein the hot list, the bitmap and the source pointer are stored in a storage unit.

3. The flash memory device with a wear-leveling mechanism as in claim 2, wherein the storage unit further comprises:
    a logical-to-physical address translation table, provided for the controller to map a logical block address and a physical block address; and
    a log block table, collocated with the logical-to-physical address translation table, for recording a link relation of a block and a sub-block of the physical memory block.

4. The flash memory device with a wear-leveling mechanism as in claim 3, wherein the storage unit is embedded into the controller or connected to the controller externally.

5. The flash memory device with a wear-leveling mechanism as in claim 3, wherein the controller stores the accumulated erase count of each physical memory block and an overall average erase count, and confirms whether or not the physical memory block is a physical memory block with high erase count according to the erase count of the physical memory block and the overall average erase count.

6. The flash memory device with a wear-leveling mechanism as in claim 5, wherein the physical memory block is confirmed as a physical memory block with high erase count, if the controller determines that the erase count of any of the physical memory blocks is greater than a predetermined value of the overall average erase count.

7. The flash memory device with a wear-leveling mechanism as in claim 3, wherein the source pointer points at the bitmap sequentially and cyclically, and after the source pointer passes through an erased physical memory block marked in the bitmap, the bitmap sets the erased physical memory block as a not-yet-erased physical memory block.

8. The flash memory device with a wear-leveling mechanism as in claim 3, wherein the controller further comprises:
    a system interface, coupled to an application system, and serving as a transmission interface for transmitting an instruction and data between the application system and the flash memory device;
    a memory interface, coupled to the flash memory;

a data buffer, coupled between the system interface and the memory interface, for buffering a data transmitted between the application system and the flash memory; and a microprocessor, coupled to the system interface, the memory interface and the storage unit, for executing an instruction issued by the application system to the flash memory device, and executing a wear leveling operation according to the hot list and the source pointer.

9. A controlling method of a flash memory device with a wear-leveling mechanism as in claim 1, comprising the steps of:

moving valid data in at least one desired recycle physical memory block into an erased physical memory block and storing the valid data into the erased physical memory block;

updating the source pointer, if the logical block address of the desired recycle physical memory block is on the hot list, and the erase count of the desired recycle physical memory block exceeds a predetermined erase count; and moving data in the physical memory block pointed to by the source pointer to the desired recycle physical memory block, and storing the data into the desired recycle physical memory block.

10. The controlling method of a flash memory device as in claim 9, wherein after the flash memory device is started, the controlling method further comprises:

loading the hot list, the bitmap, the source pointer, a logical-to-physical address translation table and a log block table.

11. The controlling method of a flash memory device as in claim 9, wherein the predetermined erase count is the sum of an average erase count of the physical memory blocks and a predetermined value, and the predetermined erase count is used for confirming that the desired recycle physical memory block is a physical memory block with high erase count.

12. The controlling method of a flash memory device as in claim 9, further comprising the steps of:

erasing a physical memory block pointed to by the source pointer;

updating the erase count of the erased physical memory block and the average erase count of the physical memory blocks; and updating an erase status in the bitmap.

13. The controlling method of a flash memory device as in claim 9, further comprising the steps of:

erasing the desired recycle physical memory block;

updating the erase count of the desired recycle physical memory block and the average erase count of the physical memory blocks; and updating an erase status in the bitmap.

14. The controlling method of a flash memory device as in claim 9, wherein if the source pointer is updated, the source pointer will point at the bitmap sequentially and cyclically, and after the source pointer passes through an erased physical memory block marked in the bitmap, the bitmap sets the erased physical memory block as a not-yet-erased physical memory block.

* * * * *